United States Patent Office 3,780,112
Patented Dec. 18, 1973

3,780,112
SUBSTITUTED ETHYLENE BIS(PHOSPHINE OXIDES)
Kurt Weinberg, Bergen, N.J., and James E. McKeon, Westchester, N.Y., assignors to Union Carbide Corporation, New York, N.Y.
No Drawing. Filed Aug. 9, 1972, Ser. No. 279,270
Int. Cl. C07f 9/02
U.S. Cl. 260—606.5 P
10 Claims

ABSTRACT OF THE DISCLOSURE

A process for the production of substituted ethylene bis(phosphine oxides) which comprises contacting a substituted phosphine halide with diethylene glycol at a temperature of −25° C. to 100° C. in the presence of an acid acceptor to produce the corresponding phosphinous ester, and thereafter heating the phosphinous ester at temperatures of 100° to 400° C.

---

The present invention relates to a novel process for the production of substituted ethylene bis(phosphine oxides) and more particularly to a process for the preparation of ethylene bis(diphenylphosphine oxide).

Substituted ethylene bis(phosphine oxides) are known compounds which are useful for a wide variety of purposes. Heretofore, however, there has been no satisfactory economical method for the production of this class of compositions. To illustrate, known preparations of substituted ethylene bis(phosphine oxides) include the preparation of ethylene bis(diphenylphosphine oxide) from diphenylphosphine sodium and ethylene dibromide which is then oxidized to the corresponding dioxide. (See the publication by K. Issleib and D. W. Müller, Ber., 92, 3175 (1959).)

In an analogous manner the corresponding disulfide has been prepared. Unfortunately, this method requires the cumbersome and relatively dangerous preparation of diphenylphosphine sodium from diphenylphosphine chloride and metallic sodium. In addition, the method requires an extra step for the oxidation to ethylene bis(phosphine oxide) and finally, the yields obtainable are not entirely satisfactory from a practical commercial standpoint.

H. Schindlbauer and V. Hilzenauer, Mh. Chem., 96, 961 (1963) obtained ethylene bis(diphenylphosphine) by treatment of potassium diphenylphosphide with the diethylether of diethylene glycol. The ethylene bis(diphenylphosphine) can then be oxidized with hydrogen peroxide or peracetic acid to the corresponding dioxide. This procedure however suffers from the disadvantage that it requires the preparation of diphenylphosphine potassium which is cumbersome and relatively dangerous. Another disadvantage is that it uses as starting material the relatively expensive diethylether of diethylene glycol, and furthermore the procedure requires an extra step for the oxidation to ethylene bis(diphenylphosphine oxide).

More recently, L. D. Quin and H. G. Anderson describe the preparation of ethylene bis(diphenylphosphine oxide) from ethylene glycol by reaction with diphenylphosphine chloride. (See Journal of Organic Chemistry 29, 1859 (1964).) The yields obtainable, however, are also not satisfactory from a commercial standpoint (30–40% yield).

The present invention provides a useful and economical process for the production of substituted ethylene bis-(phosphine oxides) which comprises reacting a suitable substituted phosphine halide, as hereafter defined, with diethylene glycol in the presence of an acid acceptor and at a temperature of about −25° C. to about 100° C. to produce the corresponding phosphinous ester, and thereafter separating and heating the separated phosphinous ester at temperatures of about 100° to about 400° C.

Compounds which are contemplated by the novel process have the formula:

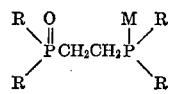

wherein R is alkyl of 1 to 6 carbon atoms, aryl of 6 to 14 carbon atoms and alkaryl, and wherein M is O or S.

Illustrative of the compounds which can be produced according to the present invention include:

ethylene bis(diphenylphosphine oxide)
ethylene bis(diphenylphosphine oxide sulfide)
ethylene bis(dimethylphosphine oxide)
ethylene bis(diethylphosphine oxide)
ethylene bis(dipropylphosphine oxide)
ethylene bis(dibutylphosphine oxide)
ethylene bis(dipentylphosphine oxide)
ethylene bis(dinaphthylphosphine oxide)
ethylene bis(dibenzylphosphine oxide)
ethylene bis(di-p-tolylphosphine oxide)
ethylene bis(di-o-tolylphosphine oxide)
ethylene bis(di-m-tolylphosphine oxide)
ethylene bis[di(o-chlorophenyl)phosphine oxide]
ethylene bis[di(p-chlorophenyl)phosphine oxide].

The suitable phosphine halides are those of the formula

wherein R has the above-indicated value, X is halogen such as bromine, chlorine iodine, preferably chlorine.

The phosphine halides contemplated can be obtained by the process disclosed in my U.S. Pat. 3,557,204, issued on Jan. 19, 1971, and assigned to Union Carbide Corporation.

Briefly, there is disclosed therein a process for the production of arylphosphine halides which comprises reacting an aryl halide with white phosphorous in the presence of a catalytic amount of a Lewis acid.

Specific illustrative aryl halides include chlorobenzene, bromobenzene, iodobenzene, fluorobenzene, p-dichlorobenzene, the tri-chlorobenzenes, o-chlorotoluene, m-chlorotoluene, 2,4-dichlorotoluene, 1-chloronaphthalene, 1-bromonaphthalene, the bromotoluenes, the iodotoluenes and 1-iodonaphthalene.

The catalysts that are employed in the above-patented process include stannic tetrachloride, titanium terachloride, aluminum triiodide, ferric triiodide, aluminum trifluoride, ferric trifluoride, ferric tribromide, and the like. The preferred catalysts include ferric trichloride, aluminum trichloride, aluminum tribromide, and ferric tribromide.

The proportions of the reactants employed in the above-patented process are not narrowly critical. For example, the mole ratio of white phosphorus (P$_4$):aryl halide can vary from about 1:½ to 1:60, preferably from about 1:2 to 1:12, and more preferably from about 1:4 to about 1:6. The Lewis acid catalyst is employed in small catalytic quantities. For example, the catalyst can be employed in a proportion of from about 0.1 weight to about 3 weight percent and preferably from about 0.2 weight percent to about 1.5 weight percent, based upon the total weight of the reactants.

The process described in U.S. Pat. 3,557,204 is carried out at elevated temperatures. The exact temperature employed is dependent somewhat upon the particular nature of the aryl halide reactant. For example, when an aryl chloride is the reactant, the operable temperature range is normally from about 280° C. to about 420° C., preferably from about 300° C. to about 400° C. and more preferably from about 330° C. to 360° C. When the aryl halide is an aryl bromide, the temperature which then can be employed will normally be within the range of from about 200° C. to about 450° C., preferably within the range of from about 250° C. to about 370° C., and more preferably from about 280° C. to about 300° C. When the aryl halide is an aryl iodide, the temperature range is preferably somewhat below the temperatures indicated for aryl bromides, for example, preferably from about 250° C. to about 290° C. When the aryl halide is an aryl fluoride, somewhat higher temperatures than those indicated for aryl chloride should preferably be employed. For example, a preferred temperature range when the aryl halide reactant is an aryl fluoride, will be from 400° C. to about 450° C.

For a more detailed description of the preparation of these starting materials, reference is made to the above-mentioned patent.

Diethylene glycol is also employed as a reactant in the present invention. In the case where the thio derivative is the resultant product, the starting reactant would of course be thiodiethylene glycol. Thus, the above reactants can be described as corresponding to the formula:

HOCH₂CH₂MCH₂CH₂OH wherein M is oxygen or sulfur.

The diethylene glycol starting material is readily available from a wide variety of sources and advantageously low cost material since it is produced as a by-product in the production of ethylene glycol.

The mole ratio of the reactants can vary widely. For example, the mole ratio of diethylene glycol to the phosphine halide can vary from about 0.2:1 to about 10:1 and preferably from about 0.5:1 to about 2:1.

An acid acceptor is employed in the invention. Tertiary amines are highly desirable acid acceptors for use in the invention. Examples include: pyridine, triethylamine, trimethylamine, N-dimethylaniline, and N-methylpyrrolidine.

Alkali metal bases are also useful. Examples include: sodium hydroxide or potassium hydroxide.

The acid acceptor is employed in quantities, which may vary widely. Thus, the acid acceptor may be employed in amounts equimolar to those of the phosphine halide or in larger amounts.

The process of the invention is carried out by contacting the reactants in a suitable reaction vessel. The order of addition is not critical. The reaction temperature can vary widely, for instance, temperatures, of from about −25° C. to about 100° C. are suitable, and temperatures of from about −5° C. to about +30° C. are preferred. The reaction is carried out for a period of time sufficient to produce the phosphinous ester. For instance, reaction times of from about 120 minutes to about 30 hours are suitable, depending upon temperature, nature of the reactants, and the like.

After the formation of the phosphinous ester has been completed, the ester is separated by conventional procedure and thereafter heated at temperatures of about 100° C. to about 400° C., preferably about 200° C. to about 300° C. for a period of time ranging from about 15 minutes to about 5 hours, preferably 1 to 2 hours. During this period, an Arbuzow-type rearrangement takes place and the —CH₂CH₂O— group is split off. The resultant product is thereafter separated by conventional means.

The following examples will illustrate the present invention.

EXAMPLE 1.—PREPARATION OF ETHYLENE BIS-(DIPHENYLPHOSPHINE OXIDE)

Mole ratio of diethylene glycol: diarylphosphine chloride=1:2

To a mixture of 1.2 moles (128 g.) of diethylene glycol, 2.4 moles (192 g.) of pyridine and 100 ml. of diethylether was added, under nitrogen, a solution of 2.4 moles (528 g.) of diphenylphosphine chloride in 160 ml. of diethylether with cooling (0–5° C.) and stirring. After completion of the addition the reaction mixture was stirred at room temperature for 20 hours. 120 ml. of ice water was then added, the organic layer dried over magnesium sulfate and the solvent distilled off under nitrogen. The residue was then heated in vacuum until the temperature reached about 210° C. The temperature was further raised slowly for 2 hours until it reached a temperature of 280° C. Heating was continued at this temperature for another 90 minutes. The product became crystalline on cooling and was washed with ethyl acetate. The melting point of the product was found to be 266–8° C.

The product gave no melting point depression with an authentic sample of ethylene bis(diphenylphosphine oxide). The product was analyzed with the following results:

*Analysis.*—Calc. (percent): C, 72.56; H, 5.58; P, 14.41. Found (percent): C, 72.72; H, 5.52; P, 14.46.

Mass spectrum: Parent peak at 430.

Yield: 52% of theory.

EXAMPLE 2.—PREPARATION OF ETHYLENE BIS-(DIPHENYLPHOSPHINE OXIDE)

Mole ratio of diethylene glycol: diarylphosphine chloride=1.61:1

To a mixture of 1.0 mole (106 g.) of diethylene glycol, 0.6 mole (48 g.) of pyridine and 100 ml. of diethylether was added, under nitrogen, a solution of 0.6 mole (132 g.) of diphenylphosphine chloride in 160 ml. of diethylether with cooling (0–5° C.) and stirring. 120 ml. of ice water was then added, the organic layer dried over magnesium sulfate, and the solvent distilled off under nitrogen. The residue was then heated in vacuum until the temperature reached about 210° C. The temperature was further raised slowly for 2 hours until it reached a temperature of 280° C. Heating was continued at this temperature for another 90 minutes. The product became crystalline on cooling and was washed with ethyl acetate. The melting point of the product was found to be 266–8° C.

The product gave no melting point depression with an authentic sample of ethylene bis(diphenylphosphine oxide). The product was analyzed for yield with the following result:

Yield: 43% of theory.

EXAMPLE 3.—PREPARATION OF ETHYLENE BIS-(DIPHENYLPHOSPHINE OXIDE)

Mole ratio of diethylene glycol: diarylphosphine chloride=5:1

To a mixture of 2.0 moles (212 g.) of diethylene glycol, 0.4 mole (32 g.) of pyridine and 100 ml. of diethylether was added, under nitrogen, a solution of 0.4 mole (88 g.) of diphenylphosphine chloride in 120 ml. of diethylether with cooling (0–5° C.) and stirring.

120 ml. of ice water was then added, the organic layer dried over magnesium sulfate, and the solvent distilled off under nitrogen. The residue was then heated in vacuum until the temperature reached about 210° C. The temperature was further raised slowly for 2 hours until it reached a temperature of 280° C. Heating was continued at this temperature for another 90 minutes. The product became crystalline on cooling and was washed with ethyl acetate. The melting point of the product was found to be 266–8° C.

The product gave no melting point depression with an authentic sample of ethylene bis(diphenylphosphine oxide). The product was analyzed for yield with the following result:

Yield: 44% of theory.

EXAMPLE 4.—PREPARATION OF ETHYLENE BIS-(DIPHENYLPHOSPHINE OXIDE SULFIDE)

To a mixture of 0.5 mole (61 g.) of thioethylene glycol, 0.6 mole (48 g.) of pyridine and 100 ml. of diethylether was added, under nitrogen, a solution of 0.6 mole of diphenylphosphine chloride (132 g.) in 50 ml. of ether with cooling (0–5° C.) and stirring. The mixture was then reacted and worked up as described in Example 1, except that after washing with water and drying over magnesium sulfate the mixture was subjected to a distillation in vacuum. The product distilled at 187–195 ° C./.95 mm. Hg. Peaks in its mass spectrum and results of the elemental analyses were consistent with the structure of ethylene bis(diphenylphosphine) oxide sulfide for this substance.

We claim:

1. A process for the production of compounds having the formula:

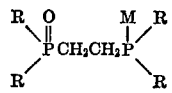

wherein R is alkyl of 1–6 carbon atoms, aryl of 6–14 carbon atoms and alkaryl, M is O or S, which comprises contacting a phosphine halide of the formula:

wherein R has the above indicated value, X is halogen, with the respective compound of the formula:

wherein M is as above indicated, at a temperature of −25° C. to 100° C., in the presence of an acid acceptor, for a time sufficient to produce the phosphinous ester represented by the formula:

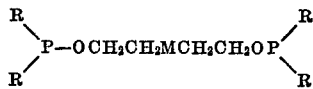

wherein R and M have the above values, and thereafter heating said phosphinous ester at a temperature of 100° to 400° C. for about 15 minutes to about 5 hours.

2. A process according to claim 1 wherein the mole ratio of the diethylene glycol to the phosphine halide is about 0.2:1 to about 10:1.

3. A process according to claim 1 wherein the mole ratio of the diethylene glycol to the phosphine halide is about 0.5:1 to about 2:1.

4. A process according to claim 1 wherein said acid acceptor is selected from the group consisting of tertiary amines and alkali metal bases.

5. A process according to claim 4 wherein said tertiary amine is pyridine.

6. A process according to claim 4 wherein said alkali metal base is sodium hydroxide.

7. A process according to claim 1 wherein said phosphine halide is contacted with said respective compound at a temperature of −5 to +30° C. and wherein the temperature of heating said phosphinous ester is in a range of about 200° to about 300° C.

8. A process according to claim 1 wherein said phosphine halide is diphenylphosphine chloride and wherein M is oxygen.

9. A process according to claim 1 wherein said phosphine halide is diphenylphosphine chloride and wherein M is sulfur.

10. A process for the production of ethylene bis(diphenylphosphine oxide) which comprises contacting diphenylphosphine chloride with diethylene glycol at a temperature within the range of about −25° C. to about 100° C. at a mole ratio of 0.2:1 to about 10:1 respectively said contact being effected in the presence of pyridine for a time sufficient to produce the phosphinous ester thereof and thereafter heating said phosphinous ester at a temperature of about 100° C. to about 400° C. for about 15 minutes to about 5 hours.

References Cited

UNITED STATES PATENTS

| | | | |
|---|---|---|---|
| 3,382,173 | 5/1968 | Zorn et al. | 260—606.5 P X |
| 2,642,461 | 6/1953 | Morris et al. | 260—606.5 P X |
| 3,278,577 | 10/1966 | Cowen et al. | 260—606.5 P X |
| 3,032,589 | 5/1962 | Hoffmann et al. | 260—606.5 P |

DANIEL E. WYMAN, Primary Examiner

P. F. SHAVER, Assistant Examiner